March 13, 1951 J. ROSAN 2,545,045
THREADED INSERT PROTECTOR
Filed March 12, 1945

Inventor
JOSEPH ROSAN
By Lyon & Lyon
Attorneys

Patented Mar. 13, 1951

2,545,045

UNITED STATES PATENT OFFICE 2,545,045

THREADED INSERT PROTECTOR

Joseph Rosan, North Hollywood, Calif.

Application March 12, 1945, Serial No. 582,294

4 Claims. (Cl. 151—32)

My invention relates to protectors for threaded inserts, and among the objects of my invention are:

First, to provide a protector which is adapted to be employed in conjunction with my insert disclosed in my copending application Serial No. 466,855, filed November 25, 1942, issued on May 14, 1946, as Patent Number 2,400,318, particularly the "one piece" form of my insert which is cast or molded in place within a body of material and designed, if need be, to be replaced by a "two piece" insert.

Second, to provide a protector which forms a liner for the threaded hole in which the insert is to fit and thus avoids or isolates the insert from intimate bond between the insert and molded material or the formation of interlocking elements due to imperfections in the surface of the insert.

Third, to provide a protector which enables the provision of a clearance groove or channel between the threaded shank and serrated head of the insert.

Fourth, to provide a protector of this character which forms a domed chamber or pocket at the inner end of the insert for the accommodation of the inner end of a screw or bolt, and in addition prevents the entrance of the molded material into the bore of the insert.

Fifth, to provide a protector of this character, which may be formed as a separate element molded or cast in place, or may be formed on the insert itself so that the insert covered by the protector is molded in place, thus permitting handling of the insert and its protector as a unit.

With the above and other objects in view as may appear hereinafter, reference is directed to the accompanying drawings in which.

Figure 2:
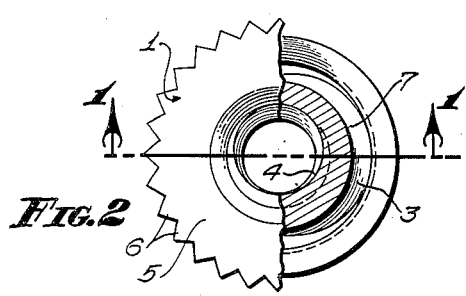
Fig. 2 is a partial end elevational view, and a partial transverse sectional view thereof taken along the line 2—2 of Fig. 1.

The insert with which my protector is employed, is indicated generally by 1. The insert, its mode of operation and its various uses are set forth in more detail in the aforementioned copending application.

The insert includes a tubular shank 2 having relatively coarse external threads 3 and usually relatively finer internal threads 4. One end of the shank is provided with a flange 5, the cylindrical periphery of which is provided with axially extending serrations 6. It is preferred to provide a small undercut or channel 7 between the external threads 3 and the under side of the flange 5. The channel extends to the depth of the threads.

The insert has heretofore been molded directly into the casting or other body of material requiring a reinforced or strengthened region to receive a bolt or nut. The peripheral serrations 6 lock the insert against rotation and the external threads 3 lock the insert against axial movement.

Figure 5:
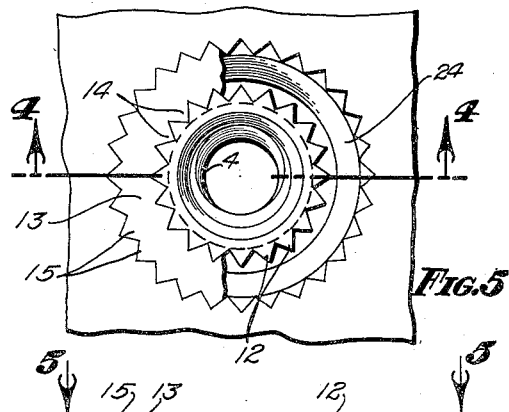
Fig. 5 is an end view of the protector and replacement insert taken along the line 5—5 of Fig. 4, with a portion of the locking ring broken away.
Figure 3:
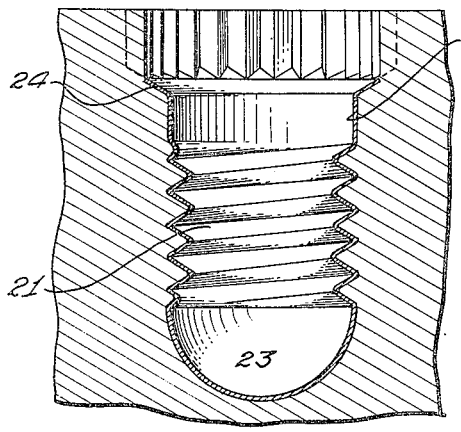
Fig. 3 is a sectional view similar to Fig. 1, showing the protector molded in place with the insert removed, and indicating by dotted lines boundaries of a socket drilled into the insert to effect its removal.
Figure 4:
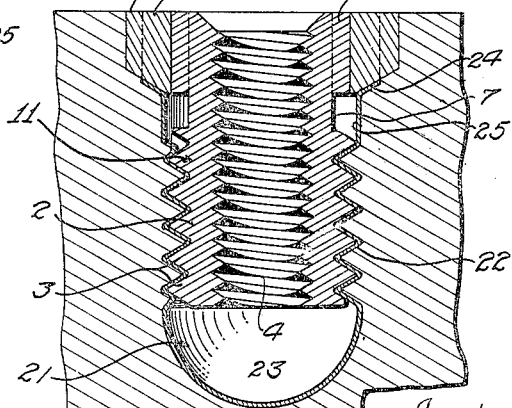
Fig. 4 is a sectional view through 4—4 of Fig. 5, showing a replacement insert within the protector.

If the internal threads of the insert are damaged, the insert may be removed by drilling a hole, using the internal opening as a guide. Such hole has a diameter approximately the major diameter of the shank and is drilled to a depth just beyond the flange, thus severing the flange from the shank. The shank may then be unscrewed from its socket in the material and the ring of the flange which remains, is pried out. The initial or "single piece" insert is then replaced by a "two piece" insert such as shown in Figs. 4 and 5. Such replacement insert is designated 11.

The shank 2 with its external and internal threads 3 and 4 is identical to the first described or single piece insert. The outer end of the shank is provided with axial serrations 12 preferably located in the annular zone defined by the root and peak diameters of the external threads 3. A locking ring 13 is employed, which has internal serrations 14, adapted to mate the serrated end 12, and external serrations 15. The diameter of the locking ring may be the same as the flange 5, or may be larger. In the latter case the external serrations 15 broach their way into the surrounding material and the locking ring is forced over the end of the shank after the shank has been screwed into the socket.

Many of the materials in which my single piece insert is molded, offer no problem in the way of removing the single piece insert by the above described method. Some materials, however, for example, certain aluminum alloys bond intermediately with the external threads 3. This is particularly true if the surface quality of the insert is not maintained at a high standard; that is, if there are imperfections in the threads 3, such as rudimentary indentations, grooves, or scratches, the material flows therein and so firmly locks the shank that great difficulty is encountered in removing the shank, and the benefits of the insert are in such cases lost. Furthermore, inserts intended for use in such materials do not permit the use of the undercut or channel 7.

Another difficulty arises from the fact that the internal threads 4 must be isolated from the material in which the insert is molded. With some materials the mere use of a threaded stud is sufficient, but in other materials which flow readily at molding temperatures, this is not suitable, and difficulty is encountered in cleaning the threads after molding.

My protector overcomes these difficulties. The protector, indicated generally by 21, is cup-shaped and formed of thin sheet material, preferably a material which may be easily stamped or drawn; for example, copper or many of the copper alloys, although both steel and aluminum, or in some cases even plastic material, may be employed.

The protector includes a threaded wall portion 22 which conforms to the external threads 3 of the shank 2. The bottom of the protector forms an end cap 23 covering the end of the insert and preferably projecting beyond the shank to form a clearance chamber adapted to receive the inner end of a stud threaded into the shank. Although in the drawings, the end cap is shown hemi-spherical, it may be flat or tapered, or irregularly shaped as desired. Where space requirements prevent, the end cap may conform to the end of the insert.

The top or rim of the protector 21 is provided with a flange 24 which underlies and bears against the flange 5. Between the threaded portion 22 and the flange 24 the protector forms a bridge portion 25 covering the channel 7. The bridge portion has a diameter approximating that of the peak diameter of the external threads 3. Thus the insert may be readily screwed into or out of the protector.

Figure 6:
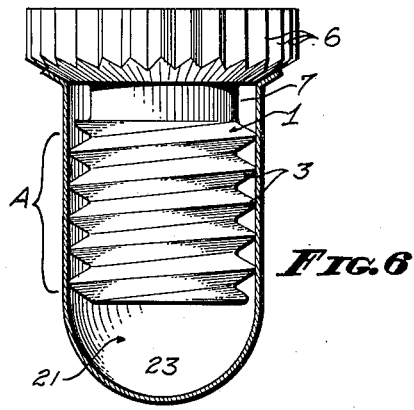
Fig. 6 is a longitudinal sectional view of the protector and its insert, showing the protector before the mating thread elements have been formed therein.

The protector may be formed with its threads by suitable dies as an independent element. However, it is preferred to utilize the insert itself as a mandrel in the forming of the threads 22. Thus as shown in Fig. 6, the protector is first drawn in the form of a cup with straight side walls. The insert is positioned therein and external die elements (not shown) are forced against the exterior of the protector blank over the region indicated by A in Fig. 6. The insert with its protector is thereafter handled as a single unit and the two are not separated until damage to the insert requires its removal, that is, the insert and protector are placed as a unit in the mold cavity and the material to be cast flows around the protector and in direct contact with the peripheral serrations 6 of the insert itself.

Figure 1:
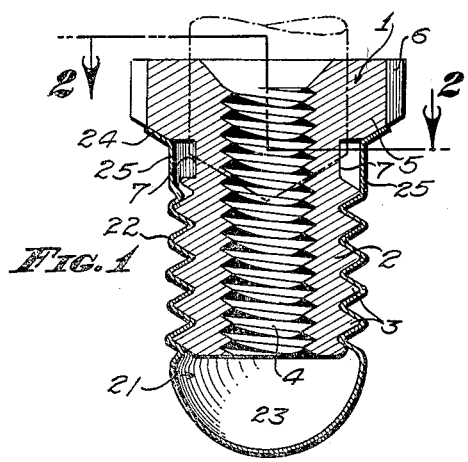
Fig. 1 is a longitudinal sectional view of the insert and its protector, taken through 1—1 of Fig. 2.

When it is desired to remove the insert, a socket is drilled to the depth and diameter indicated by broken lines in Fig. 1, severing the shank from the flange. It will be noted that the drill may be smaller in diameter than the peak diameter of the external threads 3, so that when the severed shank is unscrewed from its protector, it bears against the inner periphery of the severed flange 5 and automatically pries the flange from its engagement with the molded material.

The replacement or two piece insert is then installed by screwing the shank into the protector until its outer end is flush with the surface of the material, and then pressing the locking ring 13 thereover.

Although it is preferred to use the single piece insert and protector as a unit, it is possible to mold or cast the protector in a body of material as an independent element and employ a two piece insert.

Also, while the protector here shown is employed in conjunction with an internally threaded insert, it serves equally well with inserts provided with integral studs or the other adaptations of my insert shown in the aforementioned applications.

Many other embodiments of the invention may be resorted to without departing from the spirit of the invention.

I claim:

1. A cast-in-place insert assembly, comprising the combination of: an insert body including an externally threaded shank and a laterally enlarged head at one end thereof, said head being formed on its periphery with a multiplicity of longitudinally extended serrations which have crests formed substantially parallel with the axis of said shank and flanks defining valleys therebetween, said head also being formed, on its underside, adjacent said shank, and between said serrated periphery of said shank, with an annular convex frusto-conical seating surface; and a non-bonding generally cylindrical internally screwthreaded shell screwed on said shank, said shell having a closed end enclosing the other end of said shank, and an open end adjacent said annular frusto-conical seating surface of said head, said open end of said shell having an annular concave frusto-conical seating surface companionate to and continuously sealingly engaging with said convex frusto-conical seating surface on said head, said open end of said shell terminating beyond said concave frusto-conical seating surface in an outer annular edge which is located closely adjacent to the intersection of said serrations with the underside of said head, whereby the crests and flanks of said serrations are exposed for interlocking engagement in a surrounding body of cast material in which said assembly is to be embedded, said shell having external projection means around its periphery positioned to be embraced by the surrounding cast material to prevent axial displacement of the shell therefrom.

2. A cast-in-place insert assembly, comprising the combination of: an insert body including an externally threaded shank and a laterally enlarged head at the upper end thereof, said head being formed on its periphery with a multiplicity of longitudinally extended serrations which have crests formed substantially parallel with the axis of said shank and flanks defining valleys therebetween, said head also being formed, on its underside, adjacent said shank, and between said serrated periphery and said shank, with an annular seating surface; and a non-bonding, generally cylindrical, internally screwthreaded shell screwed onto said shank, said shell having a closed end enclosing the lower end of said shank, and an open end adjacent said annular seating surface on said head, said open end of said shell having an annular seating surface companionate to and continuously sealingly engaging with said annular seating surface on said head, said open end of said shell terminating beyond said annular seating surface of said shell in an outer annular edge which is located closely adjacent to the intersection of said serrations with the underside of said head, whereby the crests and flanks of said serrations are exposed for interlocking engagement in a surrounding body of cast material, said shell having external projection means around its periphery positioned to be embraced by the surrounding cast material to prevent axial displacement of the shell therefrom.

3. A cast-in-place insert assembly, comprising the combination of: an insert body including an externally threaded shank and a laterally enlarged head at the upper end thereof, said head being formed on its periphery with a multiplicity of longitudinally extended serrations which have crests formed substantially parallel with the axis of said shank and flanks defining valleys therebetween, said head also being formed, on its underside, adjacent said shank, and between said serrated periphery and said shank, with an annular generally downwardly facing seating surface; and a non-bonding, generally cylindrical, internally screwthreaded shell screwed onto said shank, said shell having a closed end enclosing the lower end of said shank, and an open end adjacent said annular seating surface on said head, said open end of said shell having an annular generally upwardly facing seating surface companionate to and continuously sealingly engaging with said annular seating surface on said head, said open end of said shell terminating beyond said annular seating surface of said shell in an outer annular edge which is located closely adjacent to the intersection of said serrations with the underside of said head, whereby the crests and flanks of said serrations are exposed for interlocking engagement in a surrounding body of cast material, said shell having external projection means around its periphery positioned to be embraced by the surrounding cast material to prevent axial displacement of the shell therefrom.

4. A cast-in-place insert assembly, comprising the combination of: an insert body including an externally threaded shank and a laterally enlarged head at one end thereof, said head being formed on its periphery with a multiplicity of longitudinally extended serrations which have crests formed substantially parallel with the axis of said shank and flanks defining valleys therebetween, said head also being formed, on its underside, adjacent said shank, and between said serrated periphery and said shank, with an annular convex frusto-conical seating surface; and a thin-walled, non-bonding separator shell of lesser wall thickness than the depth of the thread on said shank, mounted on said shank and formed with a screw thread conforming inside and outside with the screw thread on said shank, whereby the assembly of shank and shell has a screwthreaded exterior of pitch the same as the pitch of the thread on said shank, and of a diameter only slightly greater than said shank, said shell having a closed end enclosing the other end of said shank, and an open end adjacent said annular frusto-conical seating surface of said head, said open end of said shell having an annular concave frusto-conical seating surface companionate to and continuously sealingly engaging with said convex frusto-conical seating surface on said head, said open end of said shell terminating beyond said concave frusto-conical seating surface in an outer annular edge which is located closely adjacent to the intersection of said serrations with the underside of said head, whereby the crests and flanks of said serrations are exposed for interlocking engagement in a surrounding body of cast material in which said assembly is to be embedded.

JOSEPH ROSAN.

REFERENCES CITED

The following references are of record in the file of this patent:

UNITED STATES PATENTS

| Number | Name | Date |
|---|---|---|
| 294,639 | Larkin | Mar. 4, 1884 |
| 641,391 | Hutchison | Jan. 16, 1900 |
| 842,450 | Ennis | Jan. 29, 1907 |
| 992,331 | Briesen | May 16, 1911 |
| 1,027,782 | Watrous | May 28, 1912 |
| 1,138,219 | Hottenroth | May 4, 1915 |
| 1,264,189 | Keator | Apr. 30, 1918 |
| 1,311,261 | Braselton | July 29, 1919 |
| 1,553,967 | Unger | Sept. 15, 1925 |
| 1,627,554 | Fishel | May 10, 1927 |
| 1,637,764 | Coles | Aug. 2, 1927 |
| 1,794,410 | Kocowrek | Mar. 3, 1931 |
| 1,891,867 | Burdick et al. | Dec. 20, 1932 |
| 1,912,889 | Couse | June 6, 1933 |
| 1,962,035 | Reiter | June 5, 1934 |
| 1,996,128 | Thomson | Apr. 2, 1935 |
| 2,018,301 | Ferry | Oct. 22, 1935 |
| 2,039,105 | Naery | Apr. 28, 1936 |
| 2,171,599 | Reid | Sept. 5, 1939 |
| 2,281,164 | Maling | Apr. 20, 1942 |
| 2,334,424 | Livermont | Nov. 16, 1943 |
| 2,341,598 | Crowley | Feb. 15, 1944 |
| 2,343,143 | Gill | Feb. 29, 1944 |
| 2,399,526 | Warren | Apr. 30, 1946 |
| 2,400,318 | Rosan | May 14, 1946 |
| 2,444,145 | Rosan | June 29, 1948 |

FOREIGN PATENTS

| Number | Country | Date |
|---|---|---|
| 170,868 | Great Britain | Oct. 24, 1921 |